(12) United States Patent
Béguin et al.

(10) Patent No.: US 9,116,031 B2
(45) Date of Patent: Aug. 25, 2015

(54) WEIGHING CELL BASED ON THE PRINCIPLE OF ELECTROMAGNETIC FORCE COMPENSATION WITH OPTOELECTRONIC POSITION SENSOR

(71) Applicant: Mettler-Toledo AG, Greifensee (CH)

(72) Inventors: Christophe Béguin, Wetzikon (CH); Thomas Köppel, Oetwil am See (CH); Stephan Baltisberger, Gossau (CH)

(73) Assignee: Mettler-Toledo AG, Greifensee (CH)

( * ) Notice: Subject to any disclaimer, the term of this patent is extended or adjusted under 35 U.S.C. 154(b) by 287 days.

(21) Appl. No.: 13/780,864

(22) Filed: Feb. 28, 2013

(65) Prior Publication Data

US 2013/0220711 A1    Aug. 29, 2013

(30) Foreign Application Priority Data

Feb. 29, 2012  (EP) .................................... 12157426

(51) Int. Cl.
*G01G 7/04* (2006.01)
*G02B 6/26* (2006.01)
*G01G 7/02* (2006.01)
*G02B 6/42* (2006.01)
*G02B 7/00* (2006.01)
*G06F 3/03* (2006.01)

(52) U.S. Cl.
CPC .. *G01G 7/02* (2013.01); *G01G 7/04* (2013.01); *G01G 7/045* (2013.01); *G02B 6/4226* (2013.01); *G02B 7/003* (2013.01); *G06F 3/0304* (2013.01)

(58) Field of Classification Search
CPC ............. G01G 7/00; G01G 7/04; G01G 7/02; G01G 7/045; G01G 21/244; Y10S 177/06; G06F 3/0304; G02B 7/003; G02B 6/32; G02B 6/4226
See application file for complete search history.

(56) References Cited

U.S. PATENT DOCUMENTS 2,141,175 A    12/1938  Dawson
2,958,786 A    11/1960  Millis
(Continued)

FOREIGN PATENT DOCUMENTS

CH      463137 A      9/1968
DE     3743073 A1     7/1998
DE    10153603 A1     5/2003

OTHER PUBLICATIONS

Geometric Unsharpness Calculations, NDT Education Resource Center, http://www.ndt-ed.org/GeneralResources/Formula/RTFormula/Unsharpness/GeometricUnsharpness.htm, Jul. 25, 2012, 1 page.

*Primary Examiner* — Randy W Gibson
(74) *Attorney, Agent, or Firm* — Standley Law Group LLP

(57) ABSTRACT

A weighing cell based on the principle of electromagnetic force compensation and having an optoelectronic position sensor that includes a light source, a light receiver, and a shutter vane. The light receiver functions to generate a position sensor signal corresponding to a deflection of the shutter vane from a zero position which occurs as a result of placing a load onto a load receiver of the weighing cell. A controller functions to regulate compensation current in response to the position sensor signal in such a way that the shutter vane and the movable parts of the weighing cell connected to the shutter vane are returned to the zero position by the electromagnetic force between a coil and permanent magnet system of the weighing cell.

17 Claims, 2 Drawing Sheets

(56) References Cited

U.S. PATENT DOCUMENTS

| | | | |
|---|---|---|---|
| 3,727,708 A | 4/1973 | Adler et al. | |
| 3,805,907 A | 4/1974 | Knothe et al. | |
| 4,102,420 A * | 7/1978 | Uyama et al. | 177/25.15 |
| 4,102,421 A * | 7/1978 | Ozaki et al. | 177/185 |
| 4,274,903 A | 6/1981 | Mock | |
| 4,625,818 A | 12/1986 | Knothe et al. | |
| 4,802,541 A | 2/1989 | Bator et al. | |
| 4,825,968 A * | 5/1989 | Maaz et al. | 177/212 |
| 4,890,246 A | 12/1989 | Oldendorf et al. | |
| 4,964,478 A | 10/1990 | Stadler et al. | |
| 5,338,902 A | 8/1994 | Uchiike | |
| 5,493,078 A * | 2/1996 | Uchiike | 177/212 |
| 5,962,818 A | 10/1999 | Komoto et al. | |
| 7,034,278 B2 | 4/2006 | Tschirren et al. | |
| 7,224,871 B2 | 5/2007 | Willis | |
| 7,282,655 B2 | 10/2007 | Satoh et al. | |
| 7,307,226 B2 | 12/2007 | Iiduka | |
| 7,534,971 B2 | 5/2009 | Kuhlmann et al. | |
| 7,690,273 B2 | 4/2010 | Reber et al. | |
| 7,964,806 B2 | 6/2011 | Freydank et al. | |
| 8,309,867 B2 | 11/2012 | Baltisberger et al. | |
| 2005/0205309 A1 | 9/2005 | Iiduka et al. | |
| 2006/0118343 A1 | 6/2006 | Satoh et al. | |
| 2008/0218303 A1 | 9/2008 | Baltisberger et al. | |
| 2010/0146777 A1 | 6/2010 | Baik et al. | |
| 2010/0165660 A1 | 7/2010 | Weber et al. | |
| 2011/0259634 A1 | 10/2011 | Alderson et al. | |
| 2013/0161103 A1 * | 6/2013 | Metzger et al. | 177/210 EM |
| 2013/0220711 A1 * | 8/2013 | Beguin et al. | 177/210 EM |

\* cited by examiner

WEIGHING CELL BASED ON THE PRINCIPLE OF ELECTROMAGNETIC FORCE COMPENSATION WITH OPTOELECTRONIC POSITION SENSOR

CROSS-REFERENCE TO RELATED APPLICATIONS

This application is entitled to benefit of a right of priority under 35 USC §119 from European patent application 12157426.3, filed 29 Feb. 2012, which is incorporated by reference as if fully recited herein.

TECHNICAL FIELD

The present invention is directed to a balance that is based on the principle of electromagnetic force compensation and includes an optoelectronic position sensor.

BACKGROUND

The principle of electromagnetic force compensation has wide-ranging applications in a diverse range of weighing instruments that are used in commerce, industry, and in laboratories. This principle has the particular advantage that weighing instruments of enormous measuring accuracy can be realized with it. In this regard, an analytical balance based on the principle of electromagnetic force compensation has the capability to determine, for example, a weighing load of 100 grams with a measurement resolution of 0.01 milligrams—i.e., with a precision of one part in ten million.

A balance or weighing cell of the generic category to which the present invention belongs has a stationary base part, and a load receiver that is movably constrained to the base part and serves to receive the weighing load. A permanent magnet system is also present, is preferably mounted on the base part, has an air gap, a coil which is movably suspended in the air gap and conducts the flow of an electric compensation current, and a force-transmitting mechanism connecting the load receiver to the coil.

A provided optoelectronic position sensor, whose sensor signal corresponds to the travel distance by which the interconnected movable parts of the balance are deflected from a zero position when the load is set on the load receiver, typically includes a light source and a light receiver which are in most cases mounted on the base part with a space interval between them, as well as a shutter vane cutting through the space interval and participating in the deflection of the movable part. The signal of the position sensor is sent to a controller which, in response, regulates the compensation current in such a way that, as a result of the electromagnetic force between the coil and the permanent magnet, the shutter vane and movable parts of the balance that are connected to the shutter vane are brought back to the zero position. In other words, the regulation has the effect that the electromagnetic compensation force counterbalances the weighing load. Given that in accordance with the laws of electromagnetism the magnitude of the coil current and the resultant force are proportionate to each other, the weight of a weighing load placed on the load receiver can be determined through a measurement of the coil current.

Within the above outlined field, the present invention is focused on the optoelectronic position sensor, and in particular on the geometry of the position sensor (i.e., the relative dimensions and spatial relationships of the elements within the position sensor arrangement which encompasses the light source, the light receiver, and the shutter vane). The light receiver includes in most cases a photodiode with at least one light-sensitive area or element. A photodiode is a semiconductor element which, when exposed to light, generates a current which, within a certain range, is proportionate to the amount of incident light.

The shutter vane often has a slit-shaped passage opening, but other shapes of an opening for the passage of light are also possible. For example a circular hole or an elongated hole may be employed. The light receiver can be configured as two separate light-sensitive areas of the photodiode which are operating in a differential circuit arrangement. Deflection of the shutter from its zero position will cause a shift of the illumination image on the light receiver so that one of the light-sensitive areas will receive more light while the other light-sensitive area receives less. Accordingly, in a deflected position of the shutter vane, the respective currents generated by the two light-sensitive areas will be different from each other, wherein the current difference measured by the differential circuit arrangement of the two light-sensitive areas represents the electrical output signal of the light receiver, i.e. the position sensor signal. The functional relationship between the deflection and the electrical position sensor signal is also referred to as the characteristic of the position sensor.

The primary requirement that has to be met by the position sensor of an electromagnetic compensation balance is that the zero position (i.e., the specific position of the shutter vane at which the zero crossing of the sensor signal from negative to positive values takes place) needs to be maintained with the highest degree of accuracy and reproducibility. The zero-point sensitivity (i.e., the slope of the characteristic at its zero crossing) should therefore be as steep as practically possible, so that deflections of the order of nanometers generate a clearly measurable sensor signal.

Further, the graph of the sensor signal plotted over the travel range of the shutter vane (i.e., the characteristic of the position sensor) should be closely reproducible from one weighing cell to the next within the same production run and also for any individual weighing cell when the latter is exposed for example to temperature fluctuations, shocks or vibrations.

Lastly, as another desirable trait, the characteristic of the position sensor should, with good approximation, follow a linear profile. In particular, the sensor signal should be proportional to the deflection of the shutter vane. The requirement for linearity, and more specifically for proportionality, of the sensor signal is among other factors related to the control circuit of the electromagnetic force compensation which is preferably designed as a so-called PID controller—meaning that the compensating force and thus the coil current which is generated as output of the control circuit represents a weighted sum of a component P that is proportionate to the magnitude of the deflection, a component I that is proportionate to the time integral of the deflection, and a component D that is proportionate to the time derivative of the deflection. In order to ensure the respective proportionalities for the three components P, I, D of the coil current, the sensor signal should obviously be as much as possible proportionate to the deflection.

A way of looking at a position sensor as an optical projection system is found for example in patent CH 463 137, wherein an electromagnetic compensation balance is shown with a balance beam carrying at one end a suspended weighing pan, and at the other end a shutter vane with a slit-shaped passage opening which extends into the space interval between a light source and a light receiver. An optical system, represented in rudimentary fashion in FIG. 1 of the aforementioned reference as one lens each arranged in the light path before and after the shutter vane, serves to improve or enhance the optical image of the light source that is projected onto the light receiver. However, this kind of an arrangement of optical lenses in the light path of the position sensor requires appropriately dimensioned (i.e., generally longer) distances from the shutter vane to the light source and to the light receiver—a requirement which would be impossible to meet in particular in weighing cells of a compact, monolithic design. In addition, the production cost would be increased.

A solution presented in U.S. Pat. No. 5,338,902 aims to increase the sensitivity of the position sensor of an electromagnetic compensation balance through mechanical means. The light source and the light receiver are in this case not mounted in a fixed position on the chassis base of the balance, which would be the conventional arrangement, but are instead arranged on a long cantilever arm that is solidly connected to the movable load receiver of the balance, so that the light source and light receiver move up and down together with the load receiver. A two-armed lever which is pivotally supported on the stationary chassis base of the balance is coupled on one side to the load receiver of the balance and carries at the other end the shutter vane, so that the shutter vane moves upward when the load receiver moves downward and vice versa. Thus, the shutter vane moves up and down in unison with the light source and light receiver moving in the opposite direction and as a result there is a larger relative movement of the shutter vane against the light source and light receiver. Consequently, in comparison to the conventional stationary arrangement of the light source and the light receiver, the same amount of deflection of the load receiver causes a stronger position sensor signal to be generated. With this concept, there are again some practical concerns, as the cantilever arm would have to reach through a part of the weighing cell that is in many cases already occupied by the aforementioned force-transmitting mechanism which connects the load receiver to the compensation coil.

In an optoelectronic position sensor according to U.S. Pat. No. 3,805,907, the light source consists of a light-emitting diode, and the light receiver is formed by two phototransistors in a differential circuit arrangement. The phototransistors are arranged diametrically symmetric to each other on the face of a carrier disk that is rotatably mounted on the stationary chassis frame of the balance. By turning the carrier disk, the sensitivity characteristic, i.e. the functional dependency of the sensor signal on the amount of deflection of the shutter vane, can be adjusted. In regard to the geometry of the optical projection system, it is specifically stated that the distance between the two light-sensitive surface portions of the light receiver corresponds to the width of the slit aperture, that the light-emitting surface of the light source lies as close to the shutter vane as possible, that the light-sensitive surface areas of the light receiver are of circular shape, and that the light emitting surface of the light source is somewhat wider than the slit aperture (in particular, 1.5 times the width of the slit aperture). Here, the objection should be raised that the aforementioned characteristic or sensitivity graph of such an arrangement with circular light-sensitive surface portions of the light receiver is in no way linear over the entire deflection range of the shutter vane, but that its slope angle can become, for example, progressively steeper or progressively shallower with an increasing amount of deflection.

The known state of the art includes weighing cells with electromagnetic force compensation which have position sensors where the shutter vane is arranged in a shutter plane approximately midway between the light source and the light receiver. Slight variations in the position of the shutter plane which occur within a production run of weighing cells will lead to a random variation of the sensitivity of the sensor units. It can therefore become necessary with certain products to adjust each unit individually in the production process of the weighing cells, which adds to the manufacturing cost.

The present invention therefore provides a position sensor for a balance that is based on the principle of electromagnetic force compensation, wherein the aforementioned main requirements regarding the accuracy and reproducibility of the zero position as well as the reproducibility and linearity of the sensitivity characteristic are met to a greater extent than with the present state of the art. Ideally, such a position sensor will also be optimally adapted to manufacturing requirements.

SUMMARY

A weighing cell according to the principle of electromagnetic force compensation comprises a stationary base part; a load receiver that is constrained to the base part with guided mobility and serves to accept the weight force of a weighing load; a permanent magnet system with an air gap; a coil that is movably suspended in the air gap and, when operating in weighing mode, conducts the flow of a compensation current; and a force-transmitting mechanical connection between the load receiver and the coil.

The weighing cell further comprises an optoelectronic position sensor, as well as a controller which, in response to a signal of the position sensor, regulates the compensation current in such a way that the coil and the load receiver, through its connection to the coil, are brought back to their zero position by the electromagnetic force between the coil and the permanent magnet. The position sensor includes a light source and a light receiver which are arranged facing each other across a space interval and whose center points define an optical axis of the position sensor. A shutter vane is also present and is solidly connected to the movable force-transmitting connection but moves in the space interval essentially like a light gate in a shutter plane extending orthogonal to the optical axis.

The light receiver serves to generate a position sensor signal corresponding to a deflection of the shutter vane from a zero position which is caused by placing a load on the load receiver. A controller, which is part of the arrangement, serves to regulate the compensation current in response to the position sensor signal in such a way that the shutter vane and the movable parts of the weighing cell that are connected to the shutter vane are brought back to the zero position by the electromagnetic force acting between the coil and the permanent magnet system.

The plane which contains the shutter vane and orthogonally intersects the optical axis will hereinafter be referred to as the shutter plane.

According to the invention, the shutter distance lies in a subsection of the space interval, said subsection is adjoining to the light receiver and is several times smaller than the space interval—meaning that the subsection extends over no more than one-third of the space interval. In other words, the point of intersection of the optical axis with the shutter plane lies in a selected subsection of the space interval, said subsection being located adjacent to the light receiver, substantially shorter in length than the space interval and taking up only a fraction of the latter. This fraction is at a maximum one-third, and preferably one-fourth of the entire space interval.

The arrangement according to the invention wherein the shutter vane is located several times closer to the light receiver than to the light source is principally different from the conventional practice of arranging the shutter vane approximately in the middle (i.e., equidistant from the light source and the light receiver). In particular, this arrangement is also contrary to the cited prior art of U.S. Pat. No. 3,805,907, wherein the shutter vane is arranged as close as possible to the light source.

The permanent magnet system is preferably solidly mounted on the base part. The optoelectronic position sensor, likewise, is preferably fastened in a fixed position on the base part.

The position sensor signal is a function of the shutter vane deflection and, as such, it can also be referred to as the signal function or the characteristic of the position sensor whose derivative with respect to the deflection will hereinafter be referred to as the sensitivity of the position sensor.

In a one exemplary arrangement, the subsection is distinguished from the remainder of the space interval by the fact that a normalized sensitivity of the position sensor, corresponding to the derivative of the position sensor signal with respect to the deflection and scaled to a normalizing constant, essentially takes on its maximum value. In particular, the position sensor signal function thus scaled to the normalizing constant is essentially linear at least within a limited range of the deflection, wherein said limited range increases with decreasing shutter distance.

The aforementioned subsection of the space interval within which the shutter vane may be spaced from the light receiver is distinguished from the remainder of the space interval by the advantageous property that the normalized sensitivity over the aforementioned limited range of deflection is not significantly affected by a change in the shutter distance.

The discovery that within the space interval between the light source and the light receiver there is a subsection in which the aforementioned conditions for the signal function to have a steep slope angle at the zero point, good linearity, as well as invariability with shifts of the shutter plane along the optical axis are essentially satisfied and that this subsection lies adjacent to the light receiver comes as the surprising main result of experiments that were conducted and which will be described below in more detail with the help of diagrams.

The movement of the shutter vane at the moment of passing through the zero position defines a z-direction that runs perpendicular to the y-direction of the optical axis, and at the same time an x-direction that runs perpendicular to both the y-direction and the z-direction. The shutter plane extends orthogonal to the optical axis and thus coincides with the x/z plane. Strictly speaking, the movement of the shutter vane runs in the z-direction only at the exact moment of its passage through the zero position, but otherwise curves away from the z-direction due to the circular deflection path.

In an exemplary embodiment, the deflection range of the shutter vane is delimited by stops. Advantageously, the shutter vane comprises a passage opening, specifically a slit aperture with a given width in the z-direction. However, the passage opening can also have the shape of a circular or elongated hole.

In a further development of the invention, the light source comprises a light-emitting diode which is embedded in a carrier block. The light receiver preferably comprises at least one photosensitive surface area of a given height in the z-direction.

When operating in weighing mode, the light radiating from the light source through the slit aperture projects an illumination image onto the photosensitive surface area of the light receiver. The dimensional relationships between the width of the slit aperture or diameter of the passage opening, the space interval, the distance of the shutter vane from the light receiver, the diameter of the light-emitting surface area of the light source, the height of the photosensitive area of the light receiver and the full deflection amplitude of the light receiver are designed so that even with a full-amplitude deflection, the illumination image will fall within the height of the photosensitive light receiver area.

According to a further aspect of the invention, the light receiver comprises a differential photodiode with two separate photosensitive surface areas that operate in a differential circuit arrangement, are of equal rectangular shape and size, and lie apart from each other at a distance on opposite sides of a separating strip that extends in the x-direction and is comparatively narrow in the z-direction. The rectangular surface composed of the two photosensitive surface areas and the separating strip is in particular characterized by its total height in the z-direction.

In response to the distribution of the light received from the light source by way of the slit aperture, the first photosensitive surface area generates a first current and the second photosensitive surface area generates a second current, with the difference between the two currents representing the sensor signal that corresponds to the deflection of the shutter vane.

The power supply of the light source may be regulated by a feedback controller in such a way that the sum of the currents corresponding to the total amount of light falling on the first and second photosensitive areas is kept constant.

The sum of the currents that is being kept constant can now be used to serve as the aforementioned normalization constant in order to transform the position sensor signal S into the normalized position sensor signal and the sensitivity into the normalized sensitivity.

Another important conclusion drawn from the aforementioned experiments concerns the passage opening, specifically (if the passage opening is slit-shaped) the width of the slit aperture of the shutter vane. On the one hand as much light as possible should fall from the light source through the slit aperture onto the light receiver in order to obtain a solid sensor signal, but on the other hand it was found that with the inventive arrangement of the shutter plane close to the light receiver, the aforementioned conditions are optimally met if a certain maximum width of the slit aperture is not exceeded. This maximum width can be determined by taking into account that even at a full-amplitude deflection of the shutter vane, the surface area filled by the incident light (including the transition zones from the fully illuminated central area to the non-illuminated surrounding area) should lie completely within a photosensitive surface area of the light receiver.

In addition, the detailed results of the investigation lead to specific conclusions which can be used to optimize the position sensor arrangement and which are explained in the following detailed description with the help of drawings.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Figure 1:
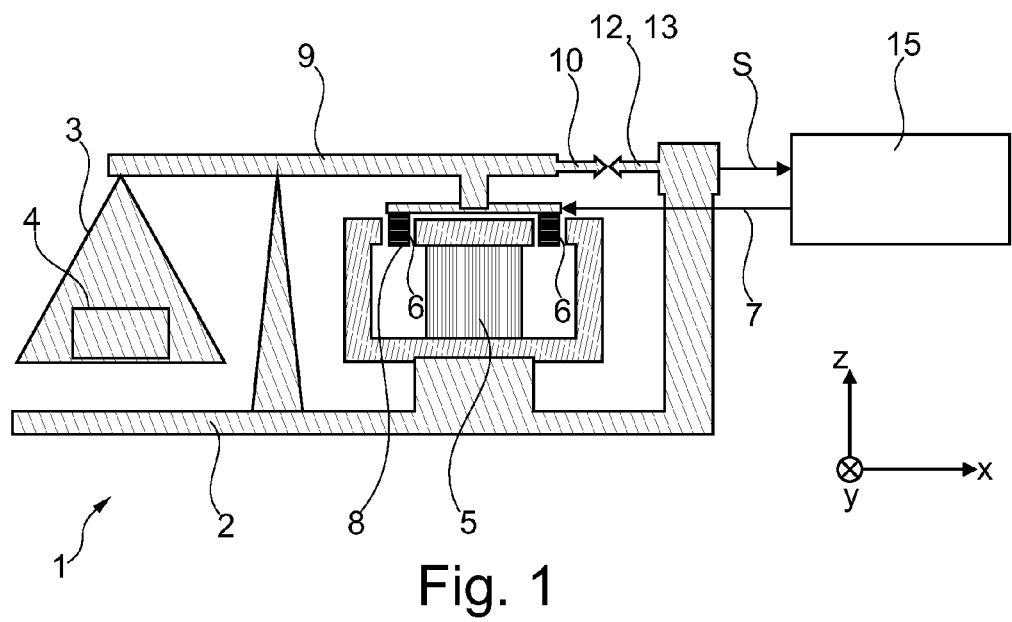
FIG. 1 shows an example of a balance with electromagnetic force compensation in a schematic representation.

A balance or weighing cell 1 with electromagnetic force compensation and optoelectronic position sensor is illustrated schematically in FIG. 1. As a spatial orientation reference, a Cartesian coordinate system x, y, z is shown, whose x- and z-axes lie in the drawing plane of FIG. 1 while the y-axis is directed into the half-space behind the drawing plane. The illustrated elements include the stationary base part 2, the load receiver 3 which is constrained to the base part 2 for guided mobility and serves to receive the weight force of the weighing load 4, the cup-shaped permanent magnet system 5 with air gap 6 (in cross-sectional view) which is rigidly mounted on the base part 2, the coil 8 which is movably suspended in the air gap 6 and conducts the flow of the compensation current 7, as well as the force-transmitting mechanical connection 9, shown here in the form of a balance beam 9, between the load receiver 3 and the coil 8. The optoelectronic position sensor (shown in symbolic representation in FIG. 1 in a view in the y-direction and drawn in detail in FIG. 2 in a view in the x-direction) generates the position sensor signal S which corresponds to the deflection z of the coil 8 from its zero position occurring as a result of placing the load 4 on the load receiver 3. This zero position is indicated symbolically in FIG. 1 by showing the arrows 10 and 12, 13 in alignment with each other, wherein the arrow 12, 13 connected to the base part 2 symbolizes the light source 12 and the light receiver 13 which are arranged on the base part 2, facing each other across a space interval (see FIG. 2). The arrow 10 which is connected to the balance beam 9 represents the shutter vane 10 with a slit-shaped passage opening 11 which moves up and down in the space interval as indicated by the double arrow 20 (see FIG. 2) and thereby produces the position sensor signal S by modulating the light stream that flows from the light source 12 to the light receiver 13.

The signal S of the position sensor is delivered to a feedback controller 15 which, in response to the signal S, regulates the compensation current 7 in such a way that the electromagnetic force that acts between the coil 8 and the permanent magnet 5 returns the shutter vane 10 together with the balance beam 9, the coil 8 and the load receiver 3 to the zero position in which the electromagnetic compensation force counterbalances the weighing load 4. According to the laws of electromagnetism, the compensation force is proportionate to the coil current 7 and, consequently, the weight of the weighing load 4 placed on the load receiver 3 can be determined by measuring the coil current 7.

Figure 2:
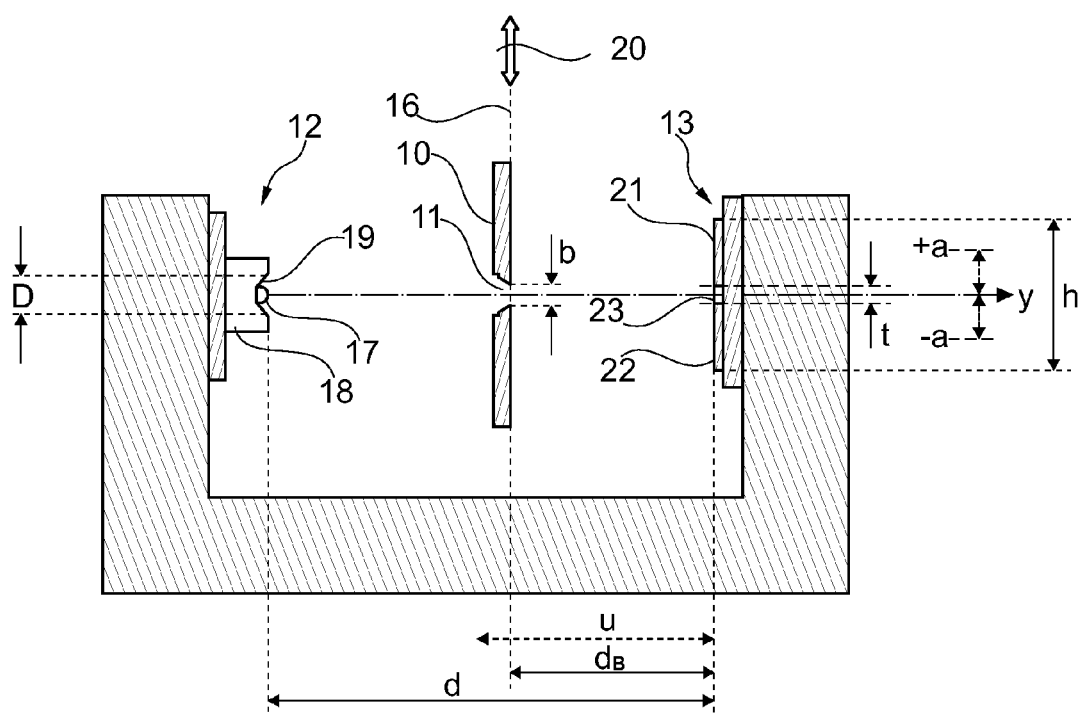
FIG. 2 shows an optoelectronic position sensor with a light source, a light receiver and a shutter vane.

The purpose of FIG. 2 is, in particular, to identify the geometric dimensions with letter symbols. The light source 12 and the light receiver 13 are arranged facing each other across a space interval d. The shutter plane 16 in which the shutter vane 10 can move up and down in the z-direction within a deflection range $-a \leq z \leq a$ lies at a distance $d_B$ from the light receiver 13 within a subsection u of the space interval, wherein the subsection u borders on the light receiver 13. The slit-shaped passage opening 11 extends in the x-direction that has been defined above and has a slit width b.

The light source 12 in a typical exemplary embodiment of the invention consists of a light-emitting diode 17, which is embedded in a carrier block 18 and located at the center of a recess 19.

The light receiver 13, likewise in a typical exemplary embodiment, consists of a differential photodiode that has two separate photosensitive surface areas 21 and 22 of equal rectangular shape and size operating in a differential circuit arrangement, which lie apart from each other at a distance t on opposite sides of a comparatively narrow separating strip 23 that extends in the x-direction. The two photosensitive surface areas 21, 22 have an overall height h in the z-direction and a total width in the x-direction.

As already mentioned, the function of the light receiver 13 for the position measurement is based on the fact that a deflection of the shutter vane 10, i.e. a displacement to a distance z from the zero position, has the result that the two photosensitive elements will generate currents $I_1$ and $I_2$ of different magnitude, wherein the current difference $S=(I_1-I_2)$ represents the electrical output signal of the light receiver, i.e. the position signal S. The position sensor signal function S(z), i.e., the functional relationship between the deflection z and the position sensor signal S, can be represented as a graph which is referred to as the characteristic of the position sensor. If the circuit arrangement and the geometry of the photosensitive surface areas 21, 22 are symmetric, the signal S(−z) generated at a negative deflection −z will be equal and opposite to the signal S(z) generated at a positive deflection z. Accordingly, the characteristic S(z) is an odd function, i.e. S(−z)=−S(z), and its graphic representation is point-symmetric relative to the origin. The slope of the graph, i.e. the derivative dS/dz of the position sensor signal function, will hereinafter also be referred to as the sensitivity E of the position sensor.

In order to evaluate the position sensor signal function S(z) independently of the illumination intensity of the light source, which can vary from case to case, it is convenient to consider a normalized, dimensionless position sensor signal $S^*=(I_1-I_2)/(I_1+I_2)$. The derivative $dS^*/dz$ of this normalized position sensor signal $S^*$ is hereinafter referred to as the normalized sensitivity $E^*$ of the position sensor, measured in the unit $[mm^{-1}]$.

In a preferred embodiment of the position sensor according to the invention which is described in the following, the light intensity of the light source is regulated electronically in such a way that the sum $(I_1+I_2)$ remains constant. With the normalizing constant $N=I_1+I_2$, the normalized position sensor signal function can be expressed as $$S^*=(I_1-I_2)/N=S/N$$

The normalized sensitivity $$dS^*/dz=(1/N)\times dS/dz$$

wherein $$E=dS/dz$$

can thus be expressed as $$E^*=E/N$$

Figure 3:
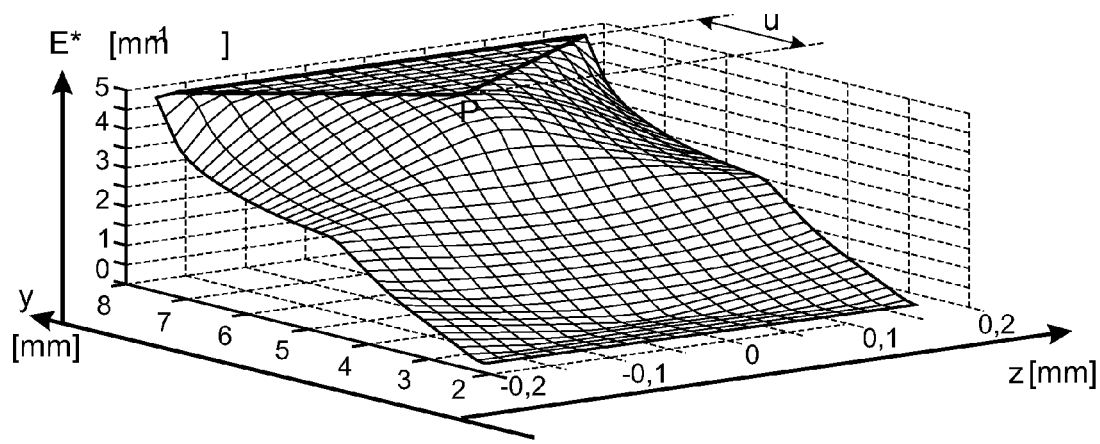
FIG. 3 shows a three-dimensional graph which is based on a computer model and serves to visualize the inventive concept.

FIG. 3 shows the normalized sensitivity $E^*$ as a function of the deflection z and of the distance y of the shutter plane from the light source in a three-dimensional graph. This representation is based on a theoretical model of the position sensor with dimensions that are typical of a practical exemplary embodiment of the position sensor according to the invention, namely a distance d=8 mm of the shutter plane from the light source, a deflection range a=±0.2 mm of the shutter vane, a combined overall height h of about 1.4 mm of the photosensitive surface areas of the differential photodiode, a width t of about 0.1 mm of the separating strip 23 between the two photosensitive surface areas 21 and 22 of the differential photodiode, and a width b of about 0.7 mm of the slit aperture. This graph shows that with increasing distance y of the shutter plane from the light source the normalized sensitivity E* rises steeply in the range from y=4 mm to 6 mm, but takes on an approximately constant value of about 5 mm$^{-1}$ or at least increases with a much smaller slope at y>6 mm in a triangular plateau area adjacent to the light receiver.

For a position sensor according to FIG. 2 with dimensions proportioned within at least the same order of magnitude as just described, the graph of FIG. 3 thus leads to the conclusion in regard to the position y of the shutter plane that within the space interval d from the light source to the light receiver there exists a subsection u in which 1) the normalized sensitivity reaches its maximum, 2) the normalized sensitivity remains nearly constant over the deflection range z that lies within the triangle, indicating that the signal function S(z) is linear within this range of z, and 3) the normalized sensitivity within the triangular range remains invariant even if the position of the shutter plane along the optical axis y is changed.

As mentioned above, the light intensity of the light source in a preferred embodiment of the position sensor according to the invention is regulated electronically in such a way that the sum of the currents $(I_1+I_2)$ generated by the two photosensitive surface areas of the light receiver remains constant. Aside from the proportionality factor $N=I_1+I_2$, the graph of FIG. 3 as well as the foregoing conclusions drawn from it are therefore likewise applicable to the non-normalized sensitivity E.

In the illustrated typical example of FIG. 3, the subsection u from the apex P of the triangular plateau area to the surface of the light receiver amounts to approximately one-fourth of the space interval d from the light source to the light receiver. However, it is advisable to arrange the shutter plane even closer to the light receiver, so that if the position of the shutter plane is shifted in the y-direction, the sensitivity will remain constant not only in the vicinity of z=0 but also over a larger range of the deflection z. On the other hand, the shutter vane should be spaced far enough away from the light receiver that production tolerances can be accommodated without a problem (i.e., that any direct contact or also the formation of dust bridges between the shutter vane and the light receiver is absolutely prevented). In a position sensor with the dimensions given above, good results were achieved during testing with a clear distance of about 0.8 to 1.2 mm between the shutter vane and the light receiver.

Figure 4:
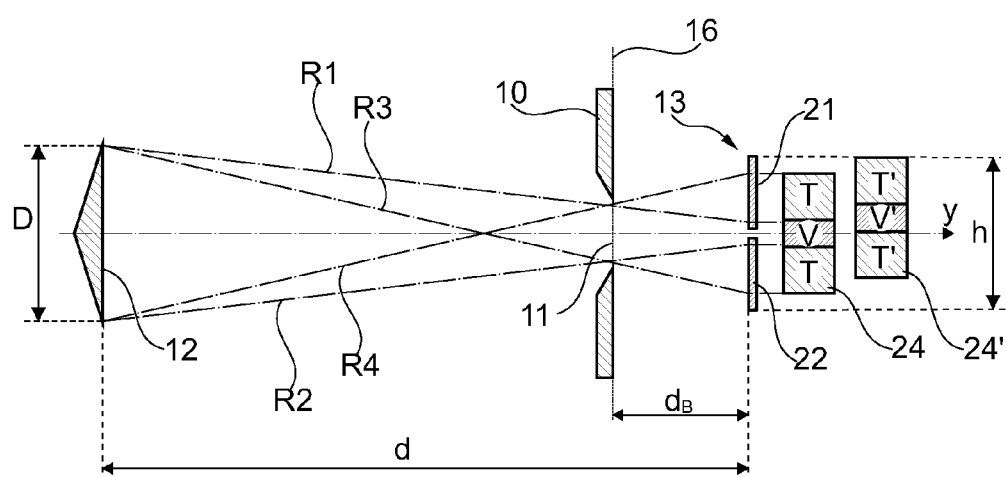
FIG. 4 represents a diagram of the optical ray geometry of the position sensor which serves to illustrate the dimensioning of the width of the slit aperture in accordance with the invention.

FIG. 4 illustrates the relevant factors in the selection of the width b of the slit aperture. The diagram illustrates the geometry of the light rays from the light source 12 through the slit 11 of the shutter vane 10 to the light receiver 13. As can be seen here, the marginal rays R1 and R2 delimit a central full-illumination area V which is flanked above and below by two partial-illumination areas T. The latter are delimited at their outside borders by the points of intersection of the marginal rays R3 and R4 with the photosensitive surface areas 21, 22, and their illumination decreases continuously from the full-illumination area V towards the outside borders. The adjacent areas of the photosensitive surface areas 21, 22 outside of the upper and lower partial-illumination areas T lie completely in the shadow of the shutter vane.

With a deflection of the shutter vane, the entire illumination image 24 with the full-illumination area V and the partial-illumination areas T shifts up or down by a corresponding amount. The mathematical model for the graph of FIG. 3 is based on the assumption that the illumination image 24 projected onto the photosensitive surface areas 21, 22 remains completely within the overall photosensitive area 21, 22 for any deflection z within a deflection range $-a \leq z \leq +a$. If all of the other dimensions and distance intervals of the sensor arrangement as well as the maximum deflection a are specified, it is therefore possible based on an analysis of the light ray geometry to determine the maximum width of the slit aperture in such a way that for example at the maximum deflection +a, the correspondingly shifted illumination image 24' still falls just inside the height h of the overall area of photosensitivity. A slit aperture of narrower width than obtained with this determination is however not always desirable, because this would only reduce the amount of light falling on the light receiver 13. In a position sensor of the aforementioned dimensions, this consideration results in a practical slit aperture width b of about 0.6 to 1 mm.

Although the invention has been described by presenting an example of a specific embodiment, it is considered evident that numerous further variants could be created based on the teachings of the present invention, for example by replacing the illustrated commercially available products for the light source and the light receiver with different types or by changing the dimensions that have been given as examples. It is also conceivable to use a light receiver consisting of a single photosensitive element with a light sensitive surface area, for example in the form of a so-called optical position sensor (product categories: photosensitive detector, photosensitive device, PSD).

LIST OF REFERENCE SYMBOLS 1 balance, weighing cell
2 base part
3 load receiver
4 load, weighing load
5 permanent magnet system
6 air gap
7 compensation current, coil current
8 Coil
9 balance beam
10 shutter vane
11 slit aperture
12 light source
13 light receiver
15 feedback controller
16 shutter plane
17 light-emitting diode
18 carrier block
19 Recess
20 double arrow
21, 22 photosensitive surface areas of 13
23 separating strip between 21 and 22
24, 24' illumination image
x, y, z axis directions
V, V' full-illumination area
T, T' partial-illumination area
u Subsection
R1, R2,
marginal rays
R3, R4
d space interval
$d_B$ distance of the shutter plane from 13
D light source diameter
b width of 11
t width of 23
h overall combined height of 21, 22 and 23
$I_1, I_2$ currents generated in 21 and 22 by the incident light
S, S(z) signal function of the position sensor
S*, S*(z) normalized signal function of the position sensor
E, dS/dz sensitivity of the position sensor E*, dS*/dz normalized sensitivity of the position sensor
N normalization constant

What is claimed is:

1. Weighing cell based on the principle of electromagnetic force compensation, comprising:
    a stationary base part;
    a load receiver constrained to the base part with guided mobility and serving to accept the weight force of a weighing load;
    a permanent magnet system with an air gap;
    a coil that is movably suspended in the air gap and, when operating in a weighing mode, conducts a flow of a compensation current;
    a force-transmitting mechanical connection between the load receiver and the coil;
    an optoelectronic position sensor, including:
        a light source and a light receiver arranged facing each other on opposite sides of a space interval located therebetween, such that center points of the light source and the light receiver define an optical axis, and
        a shutter vane that is solidly connected to the force-transmitting connection, the shutter vane movably arranged at a shutter distance on the optical axis between the light source and the light receiver, the shutter distance lying in a subsection of the space interval that extends outward from the light receiver over no more than one-third of the total space interval;
    wherein, the light receiver is adapted to generate a position sensor signal corresponding to a deflection of the shutter vane from a zero position which is caused by placing the load onto the load receiver; and
    a controller that functions to regulate the compensation current in response to the position sensor signal in such a way that the shutter vane and the movable parts of the weighing cell connected to the shutter vane are returned to the zero position by an electromagnetic force between the coil and the permanent magnet system.

2. A weighing cell according to claim 1, wherein the subsection is distinguished from the remainder of the space interval by the fact that a normalized sensitivity of the position sensor corresponding to the derivative of the position sensor signal with respect to the deflection and scaled to a normalizing constant essentially takes on its maximum value.

3. A weighing cell according to claim 2, wherein:
    within the subsection, a normalized sensor signal function corresponding to the position sensor signal scaled to the normalizing constant is essentially linear at least within a limited range of a deflection; and
    wherein said limited range of deflection increases with decreasing shutter distance.

4. A weighing cell according to claim 3, wherein within the subsection and within said limited range of the deflection, the normalized sensitivity remains substantially invariant when there is a change in the shutter distance.

5. A weighing cell according to claim 3, wherein the deflection of the shutter vane is limited by stops to the deflection range of a full deflection amplitude.

6. A weighing cell according to claim 4, wherein the deflection of the shutter vane is limited by stops to the deflection range of a full deflection amplitude.

7. A weighing cell according to claim 1, wherein the light source comprises a light-emitting diode that is incorporated in a carrier block.

8. A weighing cell according to claim 1, wherein the light receiver comprises at least one photosensitive surface area of a specified height in a z-direction.

9. A weighing cell according to claim 1, wherein the shutter vane includes a passage opening selected from the group consisting of a slit aperture with a slit width in a z-direction, a round aperture hole with a width in the z-direction, and an elongated aperture hole with a width in the z-direction.

10. A weighing cell according to claim 9, wherein:
    depending on the distribution of the light received from the light source by way of the passage opening of the shutter vane, the first photosensitive surface area generates a first current and the second photosensitive surface area generates a second current; and
    wherein the difference between the two currents represents the sensor signal that corresponds to the deflection of the shutter vane.

11. A weighing cell according to claim 10, wherein the power supply of the light source is regulated by a feedback controller in such a way that the sum of the currents corresponding to the total amount of light falling from the light source through the passage opening of the shutter vane on the first photosensitive area and the second photosensitive area is kept constant.

12. A weighing cell according to claim 11, wherein the sum of the currents that are being kept constant is used to serve as the normalizing constant in order to transform the position sensor signal into the normalized position sensor signal and the sensitivity into the normalized sensitivity.

13. A weighing cell according to claim 9, wherein:
    light radiated through the passage opening of the shutter vane projects an illumination image onto the photosensitive surface area of the light receiver; and
    wherein, with consideration for the magnitude(s) of a characteristic selected from the group consisting of the space interval, the shutter distance, the light source diameter, the height, and the full deflection amplitude, and combinations thereof, the width of the passage opening of the shutter vane is dimensioned so that the shifted illumination image which is caused by a deflection will still fall within the height of the photosensitive surface area even at the full deflection amplitude.

14. A weighing cell according to claim 1, wherein the light receiver comprises a differential photodiode with two separate photosensitive surface areas operating in a differential circuit arrangement, said surface areas being of equal rectangular shape and size and lying apart from each other at a distance on opposite sides of a separating strip that extends in a x-direction and is comparatively narrow in a z-direction.

15. A weighing cell according to claim 1, wherein the permanent magnet system is solidly mounted on the base part.

16. A weighing cell according to claim 1, wherein the optoelectronic position sensor is solidly mounted on the base part.

17. A weighing cell according to claim 1, wherein the permanent magnet system and the optoelectronic position sensor are solidly mounted on the base part.

* * * * *